United States Patent [19]

Marschner et al.

[11] Patent Number: 4,996,072
[45] Date of Patent: * Feb. 26, 1991

[54] PHYSICAL PROCESS FOR THE DEODORIZATION AND/OR CHOLESTEROL REDUCTION OF FATS AND OILS

[75] Inventors: Steven S. Marschner, Minneapolis, Minn.; Jeffrey B. Fine, Harrisburg, Pa.

[73] Assignee: General Mills, Inc., Minneapolis, Minn.

[ * ] Notice: The portion of the term of this patent subsequent to Feb. 14, 2006 has been disclaimed.

[21] Appl. No.: 310,536

[22] Filed: Feb. 13, 1989

Related U.S. Application Data

[63] Continuation-in-part of Ser. No. 20,613, Mar. 2, 1987, Pat. No. 4,804,555.

[51] Int. Cl.$^5$ .......................... A23D 5/00; C11B 3/14
[52] U.S. Cl. .................... 426/417; 426/476; 426/488; 426/487; 426/492; 426/601; 260/420; 260/428
[58] Field of Search ............... 426/417, 476, 488, 492, 426/601, 487; 260/420, 428, 428.5

[56] References Cited

U.S. PATENT DOCUMENTS

| | | | |
|---|---|---|---|
| 2,804,427 | 8/1957 | Suriano | 260/428 |
| 3,198,241 | 8/1965 | Baird | 159/13.2 |
| 3,393,133 | 7/1968 | Baird | 203/89 |
| 3,409,515 | 11/1968 | Baird et al. | 203/49 |
| 3,506,696 | 4/1970 | Bakev et al. | 260/428 |
| 3,620,283 | 11/1971 | Brown | 159/13.2 |
| 4,093,540 | 6/1978 | Sen Gupta | 426/417 |

OTHER PUBLICATIONS

Stansby, Fish Oils Their Chemistry, Technology, Stability, Nutritional Properties and Uses, 1967, pp. 216–220.

Primary Examiner—Marianne Cintins
Assistant Examiner—Evan Federman
Attorney, Agent, or Firm—John A. O'Toole

[57] ABSTRACT

Disclosed are physical processes for fats and oils, especially fish oils and dairy oils and fats, involving deodorization and/or cholesterol level reduction. Either freshly refined oils or stored oils that have oxidized (such as reverted fish oil) can be treated. When processing fish oil, the fish oil is preferably deaerated, mixed with steam, heated, flash vaporized, thin-film stripped with countercurrent steam, cooled (all steps being performed under vacuum), and then stored under oxygen free conditions. When processing dairy and various other oils and fats, certain of the above steps such as initial deaeration and final storage under oxygen free conditions may be eliminated. The process provides oils and fats from which all or a substantial portion of the free or non-esterified cholesterol has been removed and which, at least in the case of fish oils, are clean tasting.

22 Claims, 2 Drawing Sheets

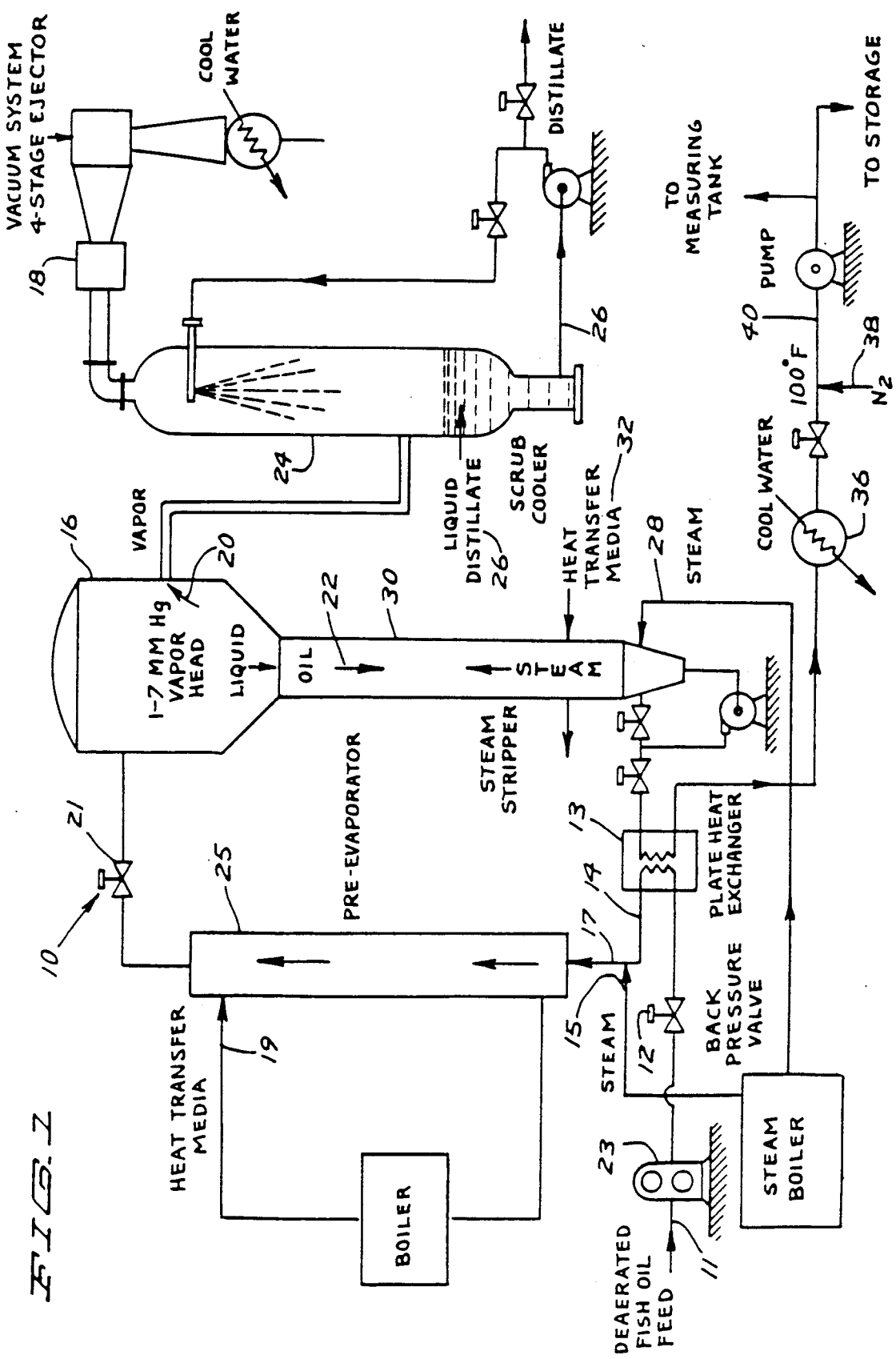

PHYSICAL PROCESS FOR THE DEODORIZATION AND/OR CHOLESTEROL REDUCTION OF FATS AND OILS

CROSS-REFERENCE TO RELATED APPLICATION

This application is a continuation in part application of copending application Ser. No. 020,613, filed Mar. 2, 1987 now U.S. Pat. No. 4,804,555.

BACKGROUND OF THE INVENTION

1. Technical Field

The present invention relates to food products. More particularly, the present invention relates to methods for treating fats and oils especially fish oils and dairy fats and oils, for deodorization and/or cholesterol level reduction. In its product aspect, the present invention relates to edible fats and oils, especially fish oils and dairy fats and oils, characterized in part by bland flavor and reduced cholesterol level.

2. Background Art

A great deal of attention has been given to the various health benefits apparently associated with the consumption of fatty fish. The health benefits appear to be related to the presence of high levels of the n-3 family of polyunsaturated fatty acids. Oils containing these fatty acids, such as fish oils, are referred to as "omega-3" oils and desirably contain high levels of n-3 fatty acids, especially eicosapentaenoic acid ("EPA") and docosahexaenoic acid ("DHA").

Notwithstanding the present interest, non hydrogenated fish oil, generally, to date has not been used widely in food products due to problems in odor, flavor and especially stability, primarily oxidative rancidity. Also, fish oil undesirably contains cholesterol. However, canned salmon has had added salmon oil. Also, certain canned meat products have been marketed in Japan which have had refined fish oil added as a nutritional supplement.

Hydrogenated fish oils are much more stable due to the decrease in the degree of polyunsaturation and are widely used in Europe for margarine. Hydrogenation is also effective in reducing odor and off-flavor development after deodorization. However, hydrogenation by decreasing polyunsaturation, including the n-3 fatty acid content, correspondingly decreases the health value of fish oil.

The present invention in its broad aspect relates to a physical method for reducing the cholesterol level of, and/or deodorizing fats and oils. For fish oil in which high levels of undesirable odor and cholestrol, are problems, the present invention involves the simultaneous reduction of cholesterol level and deodorization. For dairy and various other fats and oils which have high native cholestrol levels, but which do not have particular other problems, the focus of the present invention is directed principally to the reduction in cholestrol level, even though deodorization may also occur. Reducing the cholesterol content of a fat or oil is also nutritionally important since reducing cholesterol intake can reduce serum cholesterol, and reducing serum cholesterol has been shown to lower the risk of heart disease. Chemical extractant methods for cholesterol removal or reduction in oils are known. Chemical methods are too expensive, however, for commercial scale use. Also, chemical extraction undesirably results in the production of oils contaminated by residual amounts of chemical extractants. While several chemical methods for removing cholesterol are known, the only physical method believed known in the art is molecular distillation.

Molecular distillation for cholesterol reduction, however, requires extreme operating conditions including a pressure in the micron range. While molecular distillation is effective for removing some but not all cholesterol, the process can yield a fish oil with undesirable darkening of oil color and an undesirable strong "chemical" flavor. The dark color and off-flavor are due to the presence of odoriferous materials which remain after completion of molecular distillation. Thus, with respect to fish oils, molecular distillation still requires subsequent deodorization. The two processes cannot be combined since the vacuum conditions which define molecular distillation preclude the addition of steam which strips off these odoriferous materials. Additionally, commercial scale molecular distillation equipment is very costly. Most importantly from a cost standpoint, another major disadvantage of molecular distillation is the significant product loss which is associated with the "distillate" fraction. In molecular distillation the distillate fraction can run from 7% to as high as 20% or higher in order to achieve cholesterol reduction comparable to the results of the present invention. Since the distillate fraction is unusable due to its containing the undesirable constituents in concentrated form, such high distillate fractions reduce overall yields. Reduced yields is a most significant cost factor due to the high cost of the starting material in addition to the high cost of molecular distillation itself.

In accordance with the present invention, another physical method has been discovered for removing substantially all of the free or "non-esterified" cholesterol from fats and oils whereby the overall cholesterol level is reduced and many of the disadvantages of molecular distillation are overcome. In the principal operative step of the present invention, the operating conditions utilize a much higher pressure than employed in molecular distillation, so as to maintain steam during stripping. Surprisingly, these conditions are nonetheless effective for cholesterol removal. Furthermore, the equipment needed to practice the method is commercially available on a commercial scale, is less expensive compared to molecular distillation equipment, and is much less expensive to operate. More importantly, the distillate fraction is as low as 1% compared to the 20% for molecular distillation.

Deodorization of oils by steam stripping is commonly the finishing step in edible oil processing, including those processes involving molecular distillation such as to reduce cholesterol. The typical equipment employed contains set stations which sparge steam into a body of oil with high baffeling. Conventional deodorization can remove some sterol materials, but such reduction is very modest. In addition to reducing cholesterol level, another surprising benefit of the present invention that the present process deodorizes the fish oil simultaneously with cholesterol level reduction without substantial destruction of desirable n-3 fatty acids. Thus, a further surprising advantage of the present invention is that the conventional oil finishing deodorization step is made optional rather than mandatory for the realization of clean fish oils. In certain embodiments of the present invention a deodorization step may still be desirable, such as when cleaned fish oils of highest possible purity and quality are desired.

SUMMARY OF THE INVENTION

In its method aspect, the present invention relates to physical processes for the deodorization and/or reduction in the cholesterol levels of fats and oils, and particularly, dairy fats and oils and freshly refined or reverted fish oils.

In a preferred process dealing with fish oil, the fish oil is first deaerated to an oxygen level of less than about 0.1% dissolved oxygen (by volume). The deaeration step involves subjecting the fish oil to a vacuum with or without sparging an inert gas through the oil.

Thereafter, about 1 to 15%, preferably 2 to 5% by weight of steam is added to the fish oil while under vacuum, 1–7 mmHg absolute and the mixture heated to about 400° to 550° F., preferably 430° to 500° F., most preferably 460° to 480° F.

The mixture is flash vaporized by introduction into a zone such as a disengaging or flash chamber having a pressure of about 1-7 mmHg, to form a loaded steam vapor phase and a par-treated fish oil phase.

The par-treated fish oil is thin-film stripped with 1 to 15%, preferably 2 to 5% by weight countercurrent steam at 1 to 7 mmHg, to provide a clean fish oil of reduced cholesterol content.

The cleaned fish oil is cooled under vacuum, optionally with sparge steam, then anaerobically stored.

When dealing with dairy and va ious other fats and oils, the initial deaeration step and the final step of storing the fat or oil under anaerobic conditions may be eliminated.

In its product aspect, the present invention resides in new fish and dairy fat and oil products essentially characterized in part by substantially complete removal of non-esterified cholesterol whereby the overall cholesterol levels are reduced from native levels by up to 65% or more. With respect to fish oils, the products are also characterized by the bland flavor of clean fish oil while retaining high levels of n 3 fatty acids. The combined total n-3 fatty acid content of the processed fish oils, especially EPA plus DHA, is at least about 95% of the level of the starting material.

DETAILED DESCRIPTION OF THE INVENTION

Figure 1A:
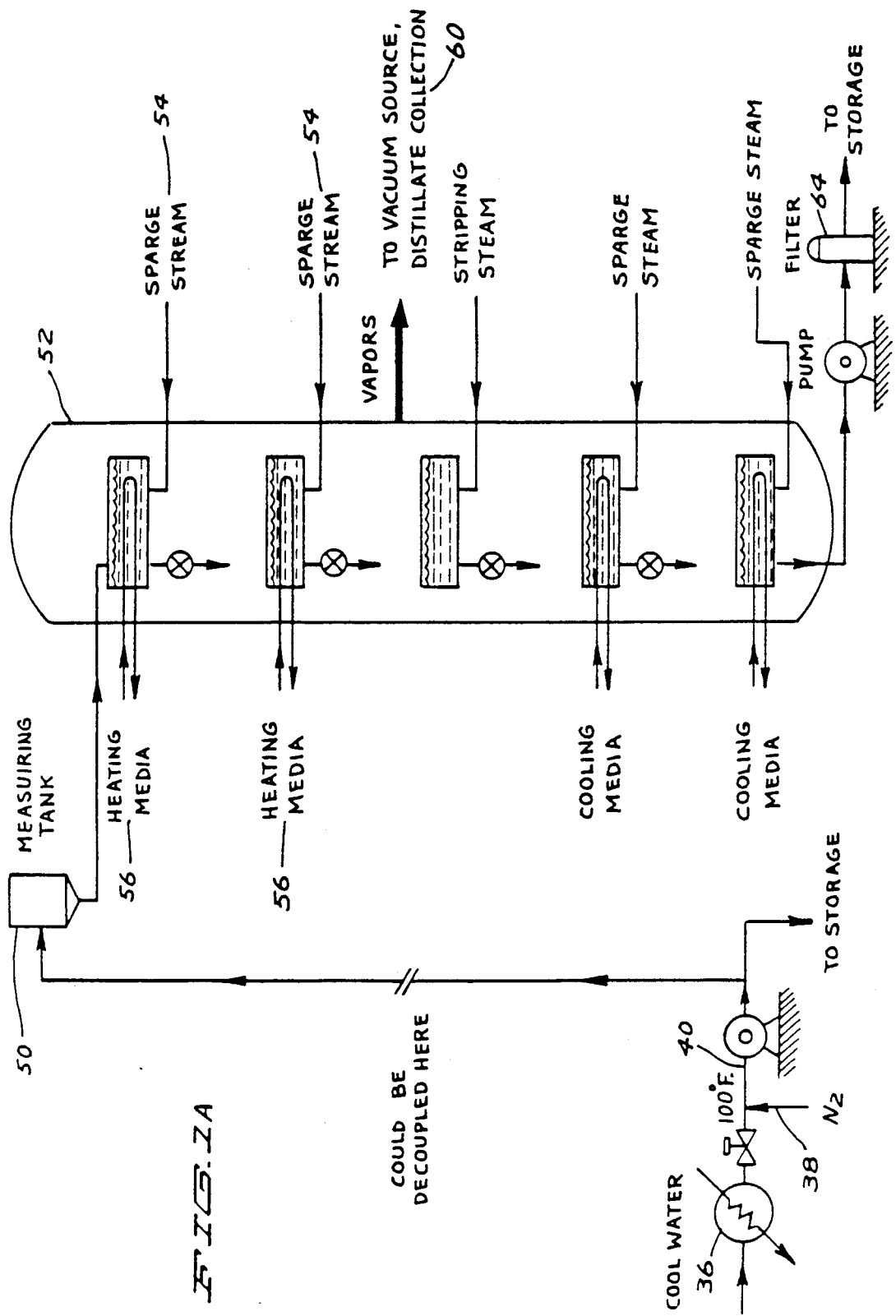
FIGS. 1 and IA are a schematic flow chart diagram of one embodiment of the present method.

In its process aspect, the present invention relates to economical, physical processes for the reduction of cholesterol level and/or the deodorization of fats and oils, and particularly fish oils and dairy fats and oils. In its product aspect, the present invention relates to processed fats and oils of reduced cholesterol levels but substantially free of residual organic solvents or chemical extractants. For fish oils, the product is also bland in flavor, but nonetheless high in EPA and DHA. Importantly, the present invention includes, inter alia, the step of thin-film steam stripping preferably with high steam consumption rates. Each of the process steps as well as product use are described in detail below.

Throughout the specification and claims, percentages and ratios are by weight and temperatures in degrees Fahrenheit unless otherwise indicated.

Fish oil(s) have long been a staple of commerce in this country and their description as well as extraction and conventional processing and use are well described in "Fish Oils" edited by M. E. Stansby, Avi Publishing Co., Inc., Westport, Conn. (1967). Especially useful for their therapeutic value herein are oils having a total n-3 fatty acid content of greater than about 20% such as menhaden oil, herring, capelin, anchovy, cod liver, salmon oil and sardine oil. The up-stream processing of fish oils to produce the present starting materials is similar to that of vegetable oils. Typically, the processing can comprise conventional refining bleaching, deodorization, and optionally winterizing and degumming. Conventional hydrogenation, however, is to be avoided. Typically, however, deodorization of an oil is the very last step in oil processing. The fish oil so prepared is referred to herein as "refined" fish oil and thus refers to undeodorized fish oil which has been refined, bleached, and optionally degummed and/or winterized. For dairy and various fats and oils, however, prior refinement is not essential and thus, in many cases, can be eliminated.

Useful herein as the starting material are both freshly refined fish oil and reverted fish oil. By the term "reverted fish oil" is meant fish oil which has been previously refined and deodorized but which has subsequently undergone degradation by the passage of time and/or exposure to oxygen and thus has reverted back to an unpalatable state. Of course, other fats and oils with high non-esterified or free cholesterol levels can also be processed successfully including, by way of example, (1) dairy fats and oils such as butter oil, (2) animal fats and lard, especially lard, and (3) marine fats. The treatment of these fats and oils is also contemplated as within the scope of the present invention. It is to be appreciated that the present invention finds particular suitability for use in treating fish oil and throughout the specification other oils are contemplated even though fish oil is specifically described however, minor changes in processing conditions may be necessary in order to achieve optimum results when specific other oils are being treated.

No attempt is made herein to distinguish between "fats" and "oils" as is sometimes made in the art since at the operating conditions of the present invention, the fatty triglyceride materials being processed are in a fluid state whether or not they exist in that physical form at room temperature.

In accordance with the preferred process, the starting fish oil whether freshly refined, reverted or mixtures thereof is characterized by an initial or native cholesterol level. The exact cholesterol level varies depending upon such factors as fish species, seasonality, geographical catch location and the like. Generally, however, such cholesterol levels can range from about 350 to 700 mg/100 gm of fish oil.

The starting fish oil is desirably first deaerated in conventional manner. (See for example, U.S. Pat. No. 3,506,696 issued Aug. 14, 1970 to Baker et al. and is incorporated herein by reference.) Deaerating the oil can be accomplished by subjecting the oil to a partial vacuum and/or by sparging an inert gas, e.g., nitrogen through the oil. For example, initially, a pressure of about 25 mmHg is maintained for about 5 to 15 minutes. Thereafter, a modest nitrogen sparge can be continued for about 5 to 10 minutes. The particular technique or conditions employed are not critical so long as after dearation the total dissolved oxygen is less than about 0.1% by volume, preferably less than about 0.05%, prior to subsequent processing in order to prevent oxidation of the oil by dissolved oxygen.

As discussed above, the deaeration step is of less importance with dairy fats and oils as well as other possible oils and may thus be eliminated for those. For dairy fats and oils, the starting oil is preferably anhydrous butterfat.

Now referring to FIG. 1, there is shown an embodiment of the present process designated generally by reference numeral 10. A deaerated fish oil feed 11 is pumped by pump 23 so as to pass through a back pressure valve 12 which maintains the entire system at a pressure of 1-7 mmHg which is provided by any conventional vacuum means 18 such as a steam jet system, e.g., four-stage. Optionally, the fish oil 11 may be modestly preheated such as with a first heating means 13 such as a plate heat exchanger so as to provide a preheated fish oil 14. Then the deaerated fish oil 14 is, in a highly preferred embodiment, mixed under vacuum with a first steam feed 15, either wet or dry but preferably dry to form a steam/oil mixture 17. While cholesterol removal can be accomplished without using the first steam feed 15, better removal of odoriferous constituents is achieved when steam is admixed with the oil feed and there is a corresponding improvement in stability of the finished fish oil. It is believed that when processing dairy fats and oils, where reduction of cholesterol is the principal concern, the steam feed can be eliminated. In such case, the oil is heated, without steam, to a temperature of 400° to 500° F.

The fish oil and steam mixture 17 can then be heated with a second indirect heat means 25 such as in a rising-film pre-evaporator using a heat transfer media 19 such as Dowtherm ™ A to raise the temperature of the mixture 17 to essentially about 400° to 550° F., preferably 430° to 500° F., most preferably about 460° to 480° F. Such indirect heating is the preferred method for heating the steam/oil mixture 17 although other techniques, e.g., further steam addition can also be used. Generally, steam consumption rates, if indirect heating is employed, run for this admixture 17 from about 0.1 to 15 lbs. of steam per 100 lbs. of fish oil, preferably about 1 to 5 lbs./100 lbs.

Conventional equipment can be used for such mixing and heating, such as simply sparging the steam 15 in line. The first steam feed's 15 condition or steam quality is not critical since thereafter the fish oil/steam mixture 17 is to be heated to the prescribed temperature range with the indirect heating being employed. Of course, the higher the steam enthalpy, the less indirect heating will be required.

Thereafter, the oil and steam mixture 17 passes optionally through means for controlling the oil feed rate 21 such as an ordinary throttling valve and is introduced to a zone or headspace 16 of relatively lower pressure to flash vaporize the steam and to flash off a portion of the cholesterol and odoriferous constituents in the oil to produce a loaded steam vapor 20 in the vapor headspace 16 and a par-treated fish oil 22. The loaded steam vapor 20 is pulled to a means for collecting the vapor 24 such as a conventional condenser or scrubber and a distil late 26 formed thereby collected for disposal and which contains the odoriferous constituents and cholesterol in highly concentrated form.

The downwardly falling par-treated fish oil 22 is then essentially very thin-film steam stripped with a second, countercurrent steam feed 28, such as by using steam stripper 30. It is important during the practice of this step to maintain the pressure in the stripper 30 at about 1 to 7 mmHg. preferably about 2-3 mmHg. The temperature of the fish oil is essentially maintained at about 400° to 550° F., preferably 430° to 500° F., most preferably 450° to 470° F., such as by controlling the oil feed rate, and/or the temperature of the heat transfer media e.g., Dowtherm ™ A or Therminol ™ 66 and/or the amount of stripping steam 28. The stripping steam rate is maintained at 1 to 15%, preferably 2 to 5%.

Equipment useful for the practicing of both the flash vaporization step and the thin film steam stripping step and thus combine both the vapor head 16 and stripper 30 are available commercially from Artisan Industries, Inc. The equipment and operation are described in U.S. Pat. Nos. 3,198,241 (issued Aug. 3, 1965 to J. L. Baird); 3,393,133 (issued July 16, 1968 to J. L. Baird) and 3,620,283 (issued Nov. 16, 1971 to Brown et al.) each of which are incorporated by reference. Generally, these patents are directed to apparatus and methods of fluid material treatment wherein liquid material to be stripped is cascaded over an alternating series of tubular jackets and discs, yielding a continual disruption of the film on the internal surface of the tube jacket in the vertical fall path after relatively short vertical distances and in which heat is supplied primarily to the continuous vertically moving, relatively thin liquid film phase. In this manner heat is conserved, hot and dry spots on the disc surface are prevented, and the ease and efficiency of handling heat-sensitive materials is enhanced. The placing of the heat exchange fluid in an indirect heat exchange relationship primarily with the thin-film phase of the internal side of the tube permits the more efficient concentration and evaporation of materials.

The stripper 30 is commonly referred to as a tube and disc type evaporator. Generally, this type of equipment is used for different purposes, namely solvent recovery, e.g., hexane removal from soybean oil, and thus typical industrial focus has been given to optimization of the distillate fraction. It is highly surprising to select such equipment for use herein and such selection goes against the strongly held beliefs in the ar with respect to the utility of such equipment for use as contemplated herein. Moreover, the equipment is used herein in an unconventional manner to achieve the present advantages. A first difference in using the equipment in the present invention is in the utilization of steam in admixture with the oil feed in the pre-evaporator, prior to the vapor head zone in preferred embodiments. Typically, oil and solvent mixtures are fed to the vapor head rather than steam and oil mixtures. Other differences are noted below in operating techniques.

The stripping steam feed 28 is preferably introduced at the bottom of the steam-stripper 30 so as to countercurrently contact the par-treated fish oil which is introduced into the top of the apparatus 30. The present thin-film steam stripping step is further importantly characterized by the steam consumption rate which can range from about 1 to 15, preferably about 2 to 5 lbs./100 lbs. of fish oil (0.01 to 0.15:1 steam to oil). Insufficient steam can undesirably lead to polymerization of the oil or at least inadequate stripping of free fatty acids and odoriferous compounds, thus yielding a product which is insufficiently deodorized. Similarly, reversion can occur more rapidly during storage if the undesirable compounds are not stripped away. Lastly, the cholesterol removal is much less efficient. Excessive steam consumption, however, can lead to much higher operating costs in the form of increased load on the vacuum system and further to incurring avoidable costs due to product loss through carry-over and unnecessary steam consumption. While high steam consumption adds to overall processing costs, steam costs are generally a much smaller cost compared to costs associated with product losses. Of course, the steam introduced to the bottom of the thin-film stripper is also pulled to the condensor or scrubber 24.

The rate at which the oil feed is fed to the thin-film stripping step is also an important independent process variable since the feed rate affects film thickness in the stripper 30. Another important distinguishing aspect of the present process is that the present process is practiced at much lower feed rates than is recommended by the equipment manufacturer. For example, for equipment rated with a throughput capacity of 25-100 lbs./hr., the presently employed feed rates typically range from about 5-8 lbs./hr. Importantly, the feed rates are controlled such that the film thickness ranges from about 1 to 25 mm and preferably about 1 to 5 mm in the thin-film stripper 30. Indeed, while the manufacturer describes the oil as falling in a thin-film, when viewed under the present, essential operating conditions, the oil/steam mixture appears to fall through the apparatus as a "rain" or mist or as very fine droplets. Thus, the present process is practiced at the far extreme end of thin-film stripping.

In addition to film thickness, it is also important that the evaporative surface of the thin-film stripper is maintained at about 400° to 650° F., preferably about 425° to 600° F., and most preferably about 450° to 550° F. using internal circulation of auxiliary heating media 32 through the stripper's 30 plumbing to provide further indirect heating of the oil for process control.

While not wishing to be bound by the present theory, it is speculated herein by virtue of the present unique thin-film technique, that the number of theoretical plates is dramatically increased and thus mass transfer rates increased so as to effect removal of the non-esterified cholesterol notwithstanding the similarity, broadly speaking, between the operating conditions and residence times of conventional steam stripping deodorization and the present method. Regardless of the theoretical mechanism, the present invention substantially reduces the overall or native cholesterol level in fish oil by up to two-thirds or more while conventional deodorization results in minimal cholesterol removal.

Most surprisingly, the fish oil is also effectively cleaned or deodorized simultaneously with the non-esterified cholesterol removal when processed under the conditions described above. Such a result is highly surprising to those familiar with oil processing and with the present equipment employed. The fish oil realized thus is also characterizd by the clean color and flavor of a deodorized fish oil.

Exiting the stripper 30 is a clean oil stream 34, still at a pressure of 1-7 mmHg, which is then desirably cooled to room temperature in a conventional manner such as first passing through the plate heat exchanger 13 to conserve energy by preheating the oil feed 11 and finally with a cooling means 36 such as a cold water heat exchanger and anaerobically stored, e.g., with a positive pressure of an inert gas 38, preferably nitrogen. Sparge steam may also be optionally applied to the oil during cooling to preserve the highest quality possible. It is important to avoid any contact between fish oil at an elevated temperature and oxygen since oxidation rates are greatly accelerated with higher oil temperatures. Such contact between oxygen and other fats, e.g., dairy oils and fats, beef tallow, etc. is far less of a problem due to lesser degrees of polyunsaturation, however, it is still desirable for these other fats and oils to be cooled under an oxygen free condition. Oxygen free conditions for the final storage of processed dairy and various other fats and oils, unlike the processed fish oil, however, is not essential.

The described process is useful for realizing a finished fish oil 40 which is reduced in cholesterol, which is deodorized and which has a good flavor.

It is another advantage of the present invention that the residence time of the fish oil during processing is much reduced compared to conventional deodorization apparatus and techniques. Manufacturer's recommended processing conditions result in residence times of 15 minutes or higher. The present process, however, results in residence times of five minutes or less. Such reductions in residence times are highly beneficial since the n-3 fatty acids which are the beneficial constituents are also more susceptible to oxidation. Thus, reduced residence times minimize their degradation.

In another preferred embodiment of the present invention depicted in FIG. 1A, however, a conventional deodorization step is added as a finishing step. Such an added deodorization step can be employed when the highest quality, cleanest flavor fish oil is desired, although extra costs are incurred. In this embodiment, the clean oil is subjected to a "second" or conventional deodorization step using conventional deodorization equipment, methods and conditions. Oil deodorization is generally considered to be a fully developed art and one skilled in the art will have no difficulty selecting suitable apparatus and techniques from among those known. Generally, after collecting in a surge/measuring tank 50, the oil 40 is fed to a conventional deodorizer 52. Steam 54 (280° to 360° F., 50 to 150 psia) is introduced at the bottom of each station and withdrawn from the vessel and pulled to a scrubber. Supplemental heating 56 and cooling 58 can be employed. Column operating pressures range from 1 to 7 mmHg by pulling a vacuum from a convention vacuum source 60. The oil is not refluxed. A twice deodorized fish oil product is withdrawn from the deodorizer 52. Optionally filtered in filter 64 and pumped to anaerobic storage. Deodorization, however, typically results in some fish oil loss, although such losses are modest, e.g., as low as 1%.

The clean fish oils realized by the present invention are critically characterized in part by removal of substantially all non-esterified cholesterol and thereby also by an overall cholesterol level reduction of at least 50% and even up to 65% or more from the native or overall cholesterol level. While not wishing to be bound by the proposed theory, it is speculated herein that the unremoved or residual cholesterol is more difficult to remove since it exists as cholesterol esters which have higher molecular weights and thus correspondingly lower volatilities. For lard, overall cholesterol reductions of even as high as 90% and higher have been obtained while in butterfat, reductions of up to 95% have been obtained.

In its product aspect, the preferred embodiment of the present invention contemplates a clean fish oil having a cholesterol level of less than 50% of the native level, preferably less than about 60-65% and wherein substantially all (i.e., in excess of 98%) of the non-esterified cholesterol has been removed. Qualitatively, the fish oil is bland and substantially free of fishy flavor to the average taster as measured by conventional sensory evaluation of oils (see, for example, A.O.C.S. Recommended Practice, pgs. 2-83). In contrast to chemical methods of cholesterol removal from deodorized fish oil, the fish oil products of the present invention are substantially free of all organic solvents (i.e., less than 1 ppm). Further, unlike clean fish oil prepared from laboratory scale or molecular distillation, the present oils are importantly characterized by a light color and an absence of a strong chemical flavor.

When other oil feeds are employed, the present invention resides in clean, bland tasting oils characterized by the removal of substantially all non-esterified cholesterol and which nonetheless are free of chemical extractants.

The finished oils of the present invention as described have use as a food ingredient in a wide variety of food applications. In particular, the fish oil can be used to fortify other foods such as fabricated fish or battered and breaded fish portions. The novel fish oils can also be used in full or partial substitution for conventional oils in many food products such as salad dressing, mayonnaise and the like.

EXAMPLE 1

A commercially obtained menhaden oil was used as the starting material having iodine value of 186, EPA content of 14.6%, DHA content of 11.2%, cholesterol level of 0.470%, and free fatty acid of 0.08%.

A semi-pilot plant oil processing system 10 conforming substantially to FIG. 1 was utilized to deodorize the above refined fish oil while simultaneously reducing its cholesterol level. The processing system employed a Model No. ESSJ 13-2 Evaporator, steam stripper (available from Artisan Industries, Inc.) as the thin film steam stripping column 30. The processing system was started up by drawing a vacuum on the entire system, heating the pre-evaporator 25 and thin film steam stripping sections 30 using Dowtherm TM HT, (partially hydrogenated terphenyl) as the heat transfer media, establishing steady state conditions with the stripping steam 15 and 28 in the pre-evaporator 25 and steam stripper sections 30, respectively and charging the system 10 with a continuous feed stream of refined fish oil.

The refined fish oil was first deaerated in a feed tank using a vacuum of 25 mmHg absolute pressure and a subsequent nitrogen sparge. Next the feed was pumped through a back pressure valve 12 at a rate of 5.2 lb/hour (2.36 kg/hr) into the processing system, maintained at 1.5 mmHg pressure, where 0.75 lb/hour (0.34 kg/hr) dry steam 15 (14.4% steam:oil ratio) was sparged in line to form a steam/oil mixture. The mixture was heated in the rising film pre-evaporator section 25, which had 1.96 Ft2 (0.18m2) heating surface area and 550° F. Dowtherm TM HT circulating in the jacket as heat transfer media 19. The steam/oil mixture achieved a final temperature of about 460°-480° F. at the top of the pre-evaporator 25, while still at 1.5 mmHg pressure.

Next the fish oil/steam mixture flowed into the disengaging chamber or vapor head 16, where the vapor phase was flash vaporized and separated from the liquid phase. The loaded vapor phase 20, consisting primarily of steam with free fatty acids, organic compounds, cholesterol, etc., was drawn to the vacuum system and collected as waste. The liquid phase 22, consisting of par-treated fish oil, was then thin film countercurrent steam stripped in the stripping section 30 which consisted of 13 tube and disc stages which were heated using the Dowtherm TM HT heat transfer media 32. The oil cascaded over the stages by gravity in a very fine film of a thickness visually measured of about 10 mm, which however in the final stages broke down into a mist of droplets with diameter of 0.2-5 mm. Simultaneously, 0.75 lb/hour (0.34 kg/hr) dry steam (14.4% steam:oil ratio) 28 was injected at the bottom of the column 30 to countercurrently strip the volatile components from the fish oil, such as free fatty acids, cholesterol, etc.

After steam stripping, the oil was immediately cooled to ambient temperature, while still under vacuum, using a small water cooled heat exchanger 36. The fish oil was then collected in nitrogen flushed containers for storage.

The final fish oil product had iodine value 184, EPA content of 14.4%, DHA content of 10.8%, cholesterol level of 0.144%, and free fatty acid of 0.03%. The fish oil processed as per the above had the bland flavor of deodorized edible oil, while maintaining the EPA and DHA omega-3 fatty acid content yet nonetheless was characterized by a significant 69.4% cholesterol level reduction.

EXAMPLE 2

A commercially available Menhaden oil was used as the starting material having iodine value of 186 EPA content of 13.0%, DHA content of 9.9%, cholesterol level of 0.463%, and free fatty acid of 0.23%.

A semi-pilot plant apparatus conforming to FIG. 1 and as used in Example 1 was utilized to deodorize the above refined fish oil while simultaneously reducing its cholesterol level. The process was started up substantially as described in Example 1 by drawing a vacuum on the entire system, heating the pre-evaporator 25 and steam stripper 30 using Dowtherm TM HT, establishing steady state conditions with the stripping steam 28 in the steam stripper 30 (with none in the evaporator), and charging the system with a continuous feed stream of refined fish oil.

The refined fish oil was first deaerated in a feed tank using a vacuum of 25 mmHg absolute pressure and a subsequent nitrogen flush. Next the feed was pumped through a back pressure valve 12 at a rate of 8.10 lb/hour (3.68 kg/hr) into the processing system, maintained at 2.5 mmHg pressure. No steam was added to the fish oil prior to heating in the pre-evaporator 25 (heating area 1.96 Ft2 or 0.18 m2) as the fish oil was heated to a final temperature of 480°-500° F. at the top of the evaporator using the Dowtherm TM HT as the media 19 in the jacket.

Next the fish oil passed into and through the vapor head 16 to flash vaporize into a liquid fraction and a vapor fraction. The liquid fraction passed into the stripping section 30 while still at 2.5 mmHg pressure. The par-treated fish oil cascaded over the 13 tube and disc stages, which were heated with 550° F. Dowtherm TM HT as media 32, in a very fine thin film of a thickness measured at about 10 mm which however in the final stages broke down into a mist of small droplets with diameters of 0.2-5 mm Simultaneously, 0.75 lb/hour (0.34 kg/hr) dry steam (9.26% steam:oil ratio) 28 was injected at the bottom of the column 30 to countercurrently strip the volatile components from the liquid phase fish oil 22, such as free fatty acids, cholesterol, etc. The vapor phase 20 produced by the flash vaporizing containing the stripping steam and these volatile components, was separated from the liquid phase in the vapor head 16 and drawn to the vacuum system 24, where it was collected as waste.

After the oil was thin film steam stripped, it was immediately cooled to ambient temperature, while still under vacuum, using a small water cooled heat exchanger 36. The fish oil 40 was then collected in nitrogen 38 flushed containers for storage.

The final fish oil product had iodine value 182, EPA content of 12.9%, DHA content of 9.6%, cholesterol level of 0.137%, and free fatty acid of 0.04%. The fish oil processed as per the above had the bland flavor of deodorized edible oil, while maintaining the EPA and DHA omega-3 fatty acid content and had a significant 70.4% reduction in cholesterol level without any steam in the pre-evaporator section.

EXAMPLE 3

Anhydrous butterfat was commercially obtained from Mid America Farms to serve as starting material, having cholesterol level of 0.208% and a free fatty acid level of 0.41%.

A semi-pilot plant apparatus conforming to FIG. 1 and as used in Examples 1 and 2 was utilized to reduce the cholesterol content of the above butterfat. The process was started up by drawing a vacuum on the entire system, heating the pre-evaporator 25 and steam stripper 30 using Dowtherm TM HT as media 19 and 32, establishing steady state conditions with the stripping steam 15 and 28 in the pre-evaporator and steam stripper 30, and charging the system with a continuous feed stream of anhydrous butterfat.

The butterfat was first deaerated and preheated to 120° F. in a feed tank using a vacuum of 25 mmHg absolute pressure and a subsequent nitrogen sparge. Next the butterfat feed 14 was pumped through a back pressure valve 12 at a rate of 7.4 lb/hour (3.36 kg/hr) into the processing system 10, maintained at 1.5 mmHg pressure, where 0.720 lb/hour (0.33 kg/hr) dry steam 15 (9.7% steam:fat ratio) was sparged in line to form a steam/fat mixture. The mixture 17 was heated in the rising film pre evaporator 25, which had 1.96 Ft2 heating surface area and 550@F Dowtherm TM HT circulating in the jacket as media 19. The mixture achieved a final temperature of 470°–490° F. at the top of the pre-evaporator 25, while at 1.5 mmHg absolute pressure.

Next the preheated or par-treated butterfat/steam mixture flowed into the disengaging chamber or vapor head 16, for flash vaporizing, where the liquid phase was separated from the vapor phase. The vapor phase 20, consisting primarily of steam with free fatty acids cholesterol, color bodies, and other volatiles, was drawn to the vacuum system 24 and collected as waste. The liquid phase 22, consisting of par-treated butterfat, was thin film countercurrent steam stripped in the steam stripper 30 consisting of 13 tube and disc stages which were heated using Dowtherm@ HT. The fat cascaded over the stages by gravity in a very fine film, which broke down in the last stages into a mist of droplets with diameter of 0.2–5 mm. Simultaneously, 0.750 lb/hour (0.33 kg/hr) dry steam 28 (10.1% steam:fat ratio) was injected at the bottom of the stripper column 30 to countercurrently strip the volatile components from the butterfat, such as free fatty acids, cholesterol, color bodies, etc.

After the fat was thin film steam stripped, it was immediately cooled to 130° F. while still under vacuum, using a small water cooled heat exchanger 36. The butterfat was then collected in nitrogen flushed containers for anaerobic storage.

The final butterfat product had cholesterol level 0.010% and free fatty acid of 0.01%. The butterfat 5 processed as per the above had the bland flavor and functionality of commercial butterfat, losing only some color bodies, with a significant 95% reduction in cholesterol level.

What is claimed is:

1. A method for deodorizing and/or reducing cholesterol level of fats and oils comprising the steps of:
   A. providing an oil having a native cholesterol and/or odoriferous material level;
   B. heating said oil to a temperature of about 400° to 550° F.;
   C. flash vaporizing said heated oil to vaporize said oil or a portion thereof and at least a portion of the cholesterol and/or odoriferous materials to realize a par-treated oil liquid phase and a loaded vaporous phase and wherein the temperature is maintained at about 400° to 550° F.;
   D. thin-film steam stripping the par-treated oil in a stripper having an evaporative surface at a pressure of about 1 to 7 mmHg with a countercurrent steam feed to strip a portion of the cholesterol and/or odoriferous material from said par-treated oil to provide a clean oil having a cholesterol content less than its native level and a loaded steam feed containing said stripped cholesterol and/or odoriferous material;
   E. removing the loaded vaporous phase and the loaded steam feed; and
   F. cooling the clean oil to a temperature of less than about 100° F.

2. The process of claim 1 wherein in step D the clean oil has a cholesterol level of less than about one-half the native cholesterol level.

3. The process of claim 2 wherein in step D, the amount of par-treated oil to steam defines an oil to steam ratio which ranges from about 1:0.01 to 0.15.

4. The process of claim 3 wherein the oil in step A is deaerated and is selected from the group consisting of fish oil, animal fats and oils, marine fats and oils, dairy fats and oils and mixtures thereof.

5. The process of claim 4 wherein the feed stream is deaerated to about 0.05% by volume of oxygen, and wherein the thin-film steam stripping is practiced in a tube and disc evaporator, and wherein the thin-film steam stripping is practiced so as to have a film thickness on the evaporative surface ranging from about 1 to 25 mm.

6. The process of claim 5 wherein the weight of the first steam feed compared to the weight of deaerated oil defines a weight ratio of first steam feed to oil which ranges from about 0.001 to 0.15:1.

7. The process of claim 1 wherein the thin-film steam stripping is practiced so as to have a film thickness ranging from about 1 to 5 mm.

8. The process of claim 7 wherein in step D, the oil to steam ratio ranges from about 1:0.02 to 0.05.

9. The process of claim 8 wherein in step B, the mixture is heated to a temperature ranging from about 430° to 500° F.

10. The process of claim 9 wherein in step D, the clean oil has a cholesterol level of less than about 35% of the native cholesterol level.

11. The process of claim 10 wherein the evaporative surface is maintained at a temperature of about 400° to 650° F. and wherein the loaded vaporous steam phase is removed by condensing the phase in a condenser.

12. The process of claim 11 additionally comprising the step of:
G. deodorizing the clean oil.

13. The process of claim 12 wherein step G is practiced with a steam sparge in which the ratio of clean oil to steam ranges from about 1:0.01 to 0.15.

14. The process of claim 1 wherein said oil is a dairy fat or oil.

15. The process of claim 14 wherein said dairy fat or oil is anhydrous butterfat.

16. The process of claim 14 wherein said clean oil is cooled in step F under vacuum.

17. The process of claim 14 wherein said oil in step A is deaerated.

18. The process of claim 11 or 12 wherein said oil is an animal fat.

19. The process of claim 18 wherein said clean oil is cooled in step F under vacuum.

20. The process of claim 18 wherein said oil in step A is deaerated.

21. The process of claim 1 additionally comprising, prior to step B, the step of:

introducing and intimately mixing a first steam feed under vacuum into and with said oil to form a steam and heated oil mixture.

22. A method for removing cholesterol from fats and oils comprising the steps of:
A. providing an oil having a native cholesterol material level;
B. heating said oil to a temperature of about 400° to 550° F.;
C. flash vaporizing said heated oil to vaporize said oil or a portion thereof and at least a portion of the cholesterol material to realize a par-treated oil liquid phase a loaded vaporous phase and wherein the temperature is maintained at about 400° to 550° F.;
D. thin-film stripping the par-treated oil in a stripper having an evaporative surface at a pressure of about 1 to 7 mmHg. with a counter-current steam feed to strip a portion of the cholesterol material from said par-treated oil to provide a clean oil having a cholesterol content less than its native level and a loaded steam feed containing said stripped cholesterol material; and
E. removing the loaded vaporous phase and the loaded steam feed.

* * * * *

UNITED STATES PATENT AND TRADEMARK OFFICE
CERTIFICATE OF CORRECTION

PATENT NO. : 4,996,072
DATED : February 26, 1991
INVENTOR(S) : Steven S. Marschner et al.

It is certified that error appears in the above-identified patent and that said Letters Patent is hereby corrected as shown below:

On the title page, Item [63], add the following after "Pat. No. 4,804,555" and immediately before the --.--:

"which is a continuation-in-part of Serial No. 921,184 filed October 21, 1986, now abandoned".

In column 1, line 10, add the following after "Pat. No.4,804,555" and immediately before the --.--:

"which is a continuation-in-part of Serial No. 921,184 filed October 21, 1986, now abandoned".

Signed and Sealed this

Twenty-sixth Day of July, 1994

Attest:

BRUCE LEHMAN

*Attesting Officer*     *Commissioner of Patents and Trademarks*